US011190855B2

(12) United States Patent
Kahn

(10) Patent No.: US 11,190,855 B2
(45) Date of Patent: Nov. 30, 2021

(54) AUTOMATIC GENERATION OF DESCRIPTIVE VIDEO SERVICE TRACKS

(71) Applicant: ARRIS Enterprises LLC, Suwanee, GA (US)

(72) Inventor: Michael R. Kahn, Cherry Hill, NJ (US)

(73) Assignee: ARRIS Enterprises LLC, Suwanee, GA (US)

(*) Notice: Subject to any disclaimer, the term of this patent is extended or adjusted under 35 U.S.C. 154(b) by 395 days.

(21) Appl. No.: 15/690,718

(22) Filed: Aug. 30, 2017

(65) Prior Publication Data

US 2019/0069045 A1    Feb. 28, 2019

(51) Int. Cl.
| | |
|---|---|
| *H04N 9/80* | (2006.01) |
| *H04N 21/84* | (2011.01) |
| *H04N 21/81* | (2011.01) |
| *H04N 21/2368* | (2011.01) |
| *H04N 21/234* | (2011.01) |
| *H04N 21/233* | (2011.01) |
| *G06K 9/00* | (2006.01) |
| *H04N 21/434* | (2011.01) |
| *G10L 13/00* | (2006.01) |

(52) U.S. Cl.
CPC ......... *H04N 21/84* (2013.01); *G06K 9/00718* (2013.01); *G10L 13/00* (2013.01); *H04N 21/233* (2013.01); *H04N 21/2368* (2013.01); *H04N 21/23418* (2013.01); *H04N 21/4344* (2013.01); *H04N 21/8106* (2013.01)

(58) Field of Classification Search
USPC .................................................. 386/239, 248
See application file for complete search history.

(56) References Cited

U.S. PATENT DOCUMENTS

| | | | |
|---|---|---|---|
| 8,760,575 B2 | 6/2014 | Gagnon et al. | |
| 9,066,049 B2 | 6/2015 | Scoggins, II et al. | |
| 9,191,639 B2 | 11/2015 | Kuspa | |
| 9,462,230 B1 * | 10/2016 | Agrawal | H04N 5/783 |
| 9,571,638 B1 * | 2/2017 | Knighton | G10L 15/26 |
| 2009/0259473 A1 * | 10/2009 | Chang | G09B 21/006 704/260 |
| 2012/0213438 A1 * | 8/2012 | Quan | G06K 9/00744 382/170 |
| 2014/0085446 A1 * | 3/2014 | Hicks | G09B 21/008 348/62 |
| 2015/0317304 A1 * | 11/2015 | An | G11B 27/036 386/285 |
| 2016/0080685 A1 * | 3/2016 | De Saint Salvy | H04N 21/4302 386/285 |

\* cited by examiner

*Primary Examiner* — Nigar Chowdhury
(74) *Attorney, Agent, or Firm* — Buchanan, Ingersoll & Rooney PC

(57) ABSTRACT

A system and method are provided for generating a descriptive video service track for a video asset. Different scenes and/or scene transitions are detected in a predetermined version of the video asset via automated media analysis. Gaps in dialogue are detected in the at least one scene via automated media analysis. Objects appearing in the at least one scene are recognized via automated media analysis, and text descriptive of at least one of the objects appearing in the at least one scene is automatically generated. An audio file of the text descriptive of the at least one of the objects appearing in the at least one scene of the predetermined version of the video asset is generated and used as part of a descriptive video service track for the video asset.

20 Claims, 4 Drawing Sheets

AUTOMATIC GENERATION OF DESCRIPTIVE VIDEO SERVICE TRACKS

BACKGROUND

Descriptive Video Service (DVS) provides enhanced access to traditional television programs, movies, and other video programs for viewers who are blind or visually-impaired. The service provides descriptive narration of key visual elements visually appearing in a video. This extra narration is inserted for playback during natural pauses occurring in the original dialogue of the program to aid low-vision viewers in better understanding the story or subject matter of a program or scene within a video program.

As an example, key visual elements may correspond to elements that viewers with vision loss might be expected to miss. Such elements may include, for instance, subtle actions, costumes, gestures, facial expressions, scene changes, onscreen text, and the like. Typically, the descriptions provided by this service can be accessed during playback of a video program or the like via a Second Audio Program (SAP) option or like track, which is typically available on most contemporary TVs and like electronic display devices.

SUMMARY

According to an embodiment, a system and method are provided for automatically generating a descriptive video service track for a video asset. Different scenes or scene transitions are detected in a version of the video asset via automated media analysis and gaps in dialogue are detected in at least one scene via automated media analysis. Objects appearing in the at least one scene are recognized and identified via automated media analysis, and text descriptive of at least one of the objects appearing in the at least one scene is automatically generated. Thereafter, an audio file of the text descriptive of the at least one of the objects appearing in the at least one scene of the version of the video asset is generated and inserted into a program stream of the video asset thereby creating a modified version of the video asset which provides descriptive video service (DVS).

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
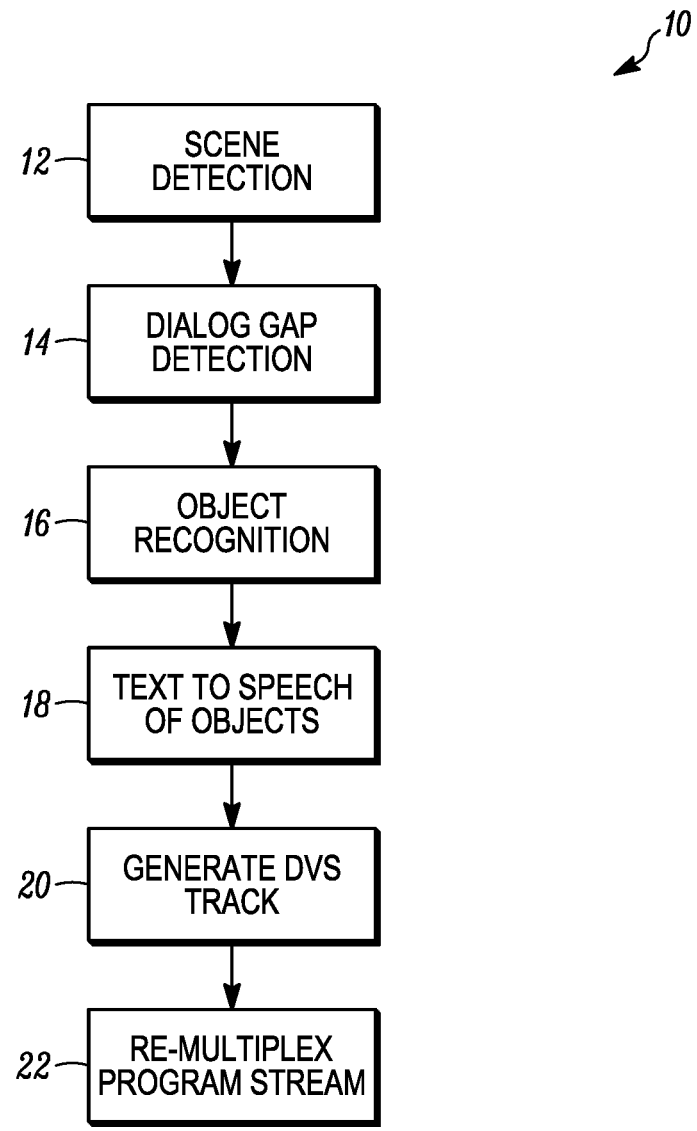
FIG. 1 is a flow diagram of a process for automatically generating a DVS track in accordance to a first embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As discussed above, Descriptive Video Service (DVS) provides contextual information for television and like programming that is intended to benefit sight-impaired viewers of the program. A DVS track typically describes scenes and conveys information that may be difficult to infer solely from listening to the main audio track of the program.

As an example, a scene of a video program may include a person silently reading a note. The text of the note may be visible in the frames of the video of the scene, but not necessarily read aloud as part of the main audio track. Thus, a sight-impaired viewer may not be able to fully appreciate the content of the note and thereby may not fully understand the significance of this part of the program. The DVS audio track alleviates this problem because the content of the note would be included in the audio (i.e., the audio would include a reading of the note) thereby permitting a sight-impaired viewer to be able to better follow along with the program and have a full appreciation of the content of the note. Of course, this provides only one example and any object or the like appearing in video may be subject to description.

The manual generation of DVS audio tracks for programs is a time consuming and laborious task and is therefore costly. Thus, many video programs available, for instance, on cable TV networks or by like content providers, may not include associated DVS tracks for any of the above referenced reasons. Although there may be a desire to make television and like programming more inclusive so that such programming accommodates viewers with disabilities, there remains a need for an efficient manner of increasing the amount of programming that includes an associated DVS track and a relatively simple process capable of generating such tracks.

Embodiments disclosed herein provide a method and system for automatic generation of DVS tracks. The process may include automatically detecting scenes and/or scene transitions as well as objects appearing within the scenes of a video program, such as a television show or movie, and visible to a viewer of the video. Gaps in dialogue (i.e., periods of relative silence) during playback of the video program and locations thereof within the video program are also automatically detected. Accordingly, a program such as a television show or movie may be automatically scanned for scenes, and objects appearing within the scenes may be identified based on the use of computerized recognition of objects. Thereafter, text describing the scenes may be generated and a text-to-speech module may convert the text describing the identified objects into an audio file. The newly created audio file may then be multiplexed into the original program stream to create a modified program stream that contains an automatically generated DVS track.

Gaps in the main dialogue of the program may be detected, such that the newly created audio file can be inserted in regions of the program where no dialog exists, to reduce the risk of obscuring the main dialogue. For instance, the inserted audio description should not overlap or distract from the dialogue of the original version of the video asset. The various components needed to accomplish the above tasks may include, for instance, text-to-speech and object recognition software components.

An example of a first embodiment of a flow diagram of a process 10 is shown in FIG. 1. In step 12, a video program is automatically analyzed via software programs or the like to detect and identify different scenes occurring within a video program. For example, significant changes in the characteristics of the video may be analyzed and detected, significant changes in the audio may be analyzed and detected, and information obtained from program metadata or an electronic program guide may be utilized to identify and distinguish between the different scenes in a video program. Accordingly, such data may be obtained through automated analysis of video, audio and text components of a video asset. Such analysis may be configured to determine several features of the video asset, including scene changes, identification of start and endings of advertisements, level of activity or motion, relative importance, or relevance of segments, and similar information. In addition, media analysis may be used to recognize a face, location, structure, or use of key terms at a specific time in a video asset or the topic of a segment or a part of the segment. Of course, any other parameter of the video program or stream may be analyzed to distinguish one scene from the next.

In step 14, gaps in the audio dialogue occurring in the program are automatically detected with computer media analysis of the audio of the program or stream. The detected gaps provide and identify potential eligible slots for ultimately inserting newly created DVS dialogue in the program. The newly generated audio which is descriptive of the video should not overlap or otherwise interfere with the original audio or dialogue of the program. Thus, in step 14, the gaps, or sections of silence, are discovered and their location within the scene are identified for providing a potential future slot for adding descriptive audio.

In step 16, object recognition is performed by automated media analysis of video, audio and/or text components of the video asset. For example, the object recognition may be performed with a neural network based learning system that uses shape and/or surface recognition and may be trained or configured to automatically recognize many common objects. The content analysis may be provided by media analysis or any form of metadata created by analysis of media, such as the analysis of video, audio, and closed captions. Thus, each scene identified in step 12 may be separately analyzed in further detail to determine the objects visible and appearing during each scene and when and where they become visible in each scene and for how long they become visible in each scene.

In step 18, automatic computer text-to-speech conversion of objects detected in step 16 and needing description may occur. Thus, new DVS dialogue is generated for insertion into the original program stream and a corresponding audio file may be generated such that the new DVS dialogue relates to the objects detected in a scene and is able to be played during an appropriate gap of dialogue within the scene when the video program is played. Accordingly, in step 20, a DVS track is generated based on the text-to-speech generation of step 18 and placement of this descriptive audio in an appropriately selected gap identified in step 14 is accomplished.

In step 22 a modified program stream is constructed which contains the DVS track created as discussed above. The DVS track may be on a separate audio PID (i.e., Packet Identifier) such that it is only played and audible when a viewer wishes to hear it. For example, customer premise equipment (CPE) can be configured, if desired, to mix the DVS track with the main audio so that a sight-impaired viewer can hear both tracks simultaneously, i.e., the DVS track has audio that plays in the gaps of the main audio. In addition, the DVS audio track may be provided and encoded in different languages (i.e., English, Spanish, etc.); thus, the selection of a desired language may also be provided as an option to the viewer of the content. The customer premise equipment (CPE) may be, for instance, a set-top box, media gateway, IP enabled media gateway or set-top box, television, gaming module, computer, laptop computer, tablet, smartphone, or the like. The term set top box is not intended to be limited to the structure of a box or be located on top of another device, such as a television set. A set top box may take any form and be placed at any location within a customer site.

Still further, customer premise equipment (CPE) may provide the option of transmitting a DVS audio track to one or more headphones so that the DVS audio is heard only by the sight-impaired viewer and not other viewers. For instance, the transmission may be via wireless transmission to personal headphones or speakers as known in the art.

Figure 2:
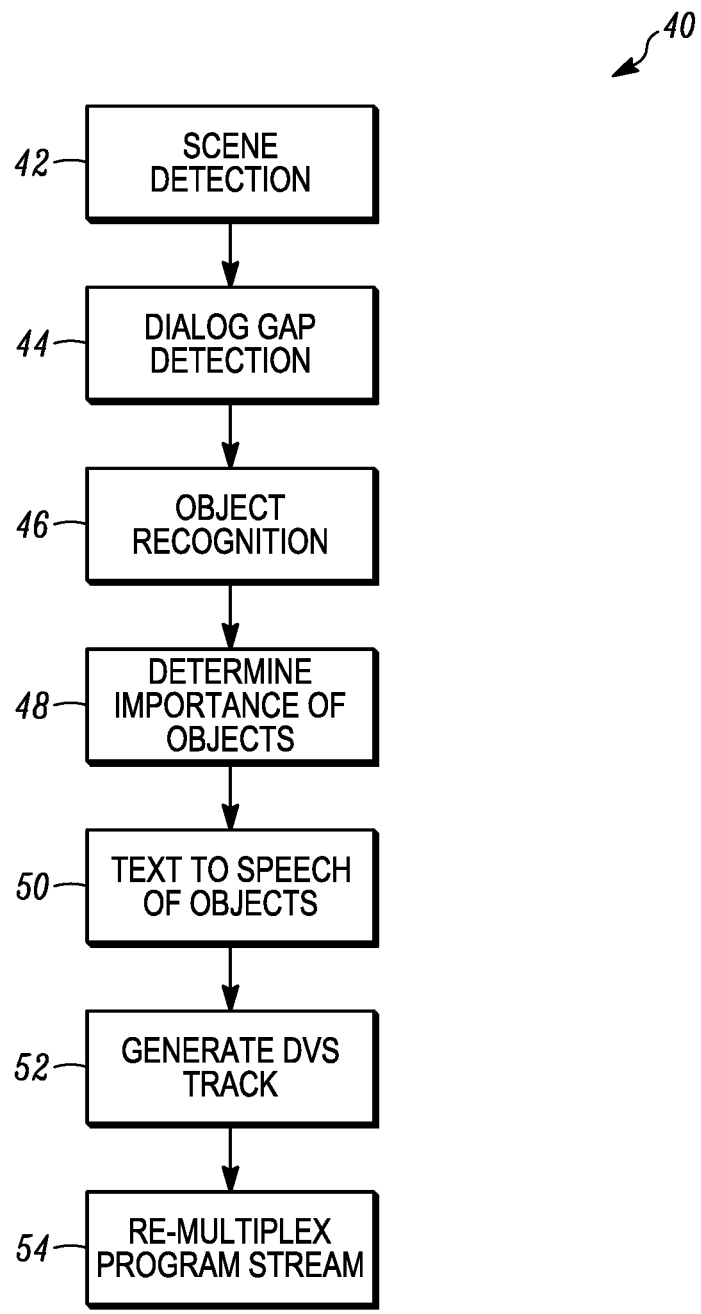
FIG. 2 is a is a flow diagram of a process for automatically generating a DVS track in accordance to a second embodiment.

FIG. 2 provides a second embodiment of a flow diagram of a process 40. Here, the steps of scene detection 42, dialogue gap detection 44, and object recognition 46 may be the same as discussed above in connection with FIG. 1. However, this embodiment includes a step 48 of automatically determining with media analysis software the relative importance of an object that is recognized within video of a scene. This embodiment is particularly useful with respect to video that may include many objects with at least some of the objects being of little significance to the video content. For example, as a result of step 46, ten or more different objects may be recognized; however, only a few may be relevant to the story and most may be of little relevance for understanding the contents of a scene. The text of the dialogue of the scene may be compared to the objects recognized within the video to further confirm the importance or lack thereof of an object appearing within the video of a scene.

Accordingly, in step 48, objects that are considered particularly relevant are distinguished from objects that may be of less relevance. By way of example, such a determination may be performed by determining the amount of time an object remains visible in a scene, determining how large the object appears in a video frame of a scene, determining if the object is centered within the video frame or appears only in the margins of the video frame, determining whether or not the object remains still within the video, determining the degree of motion of the object within the video and if the motion is followed by the video, and determining the brightness, color characteristics, etc. of the object. Based on one or more of the above or other characteristics, the objects appearing in a scene may then be ranked or scored to determine which may be of greatest relevance and which may be of little significance in understanding the scene.

In FIG. 2, the steps of converting descriptive text to speech 50, generating 54 a DVS track for a video, and re-multiplexing the program stream 56 to add the new DVS audio file to the original stream may be as described above with respect to FIG. 1.

Figure 3:
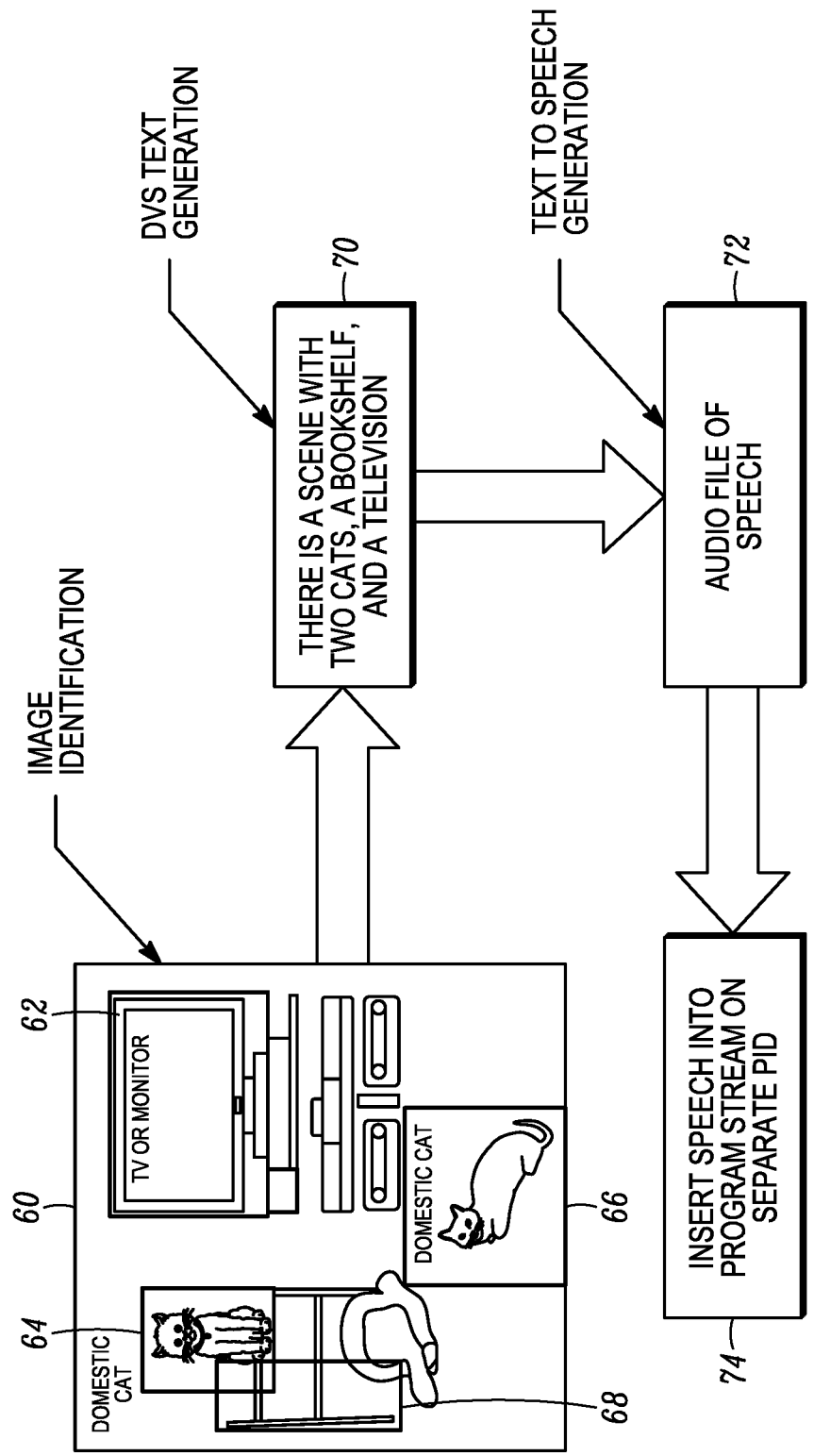
FIG. 3 is a diagram showing an example of DVS track generation in accordance to an embodiment.

FIG. 3 provides an example of a process according to an embodiment. In this example, a scene 60 contains four recognizable objects, i.e., a bookshelf 62, two cats 64 and 66, and a television 68. Thus, the system automatically identifies this as a separate scene within the video program, automatically detects the audio of the program for gaps during this scene, and recognizes the above four objects, 62, 64, 66 and 68. As a result, the system generates text 70 describing the objects; for instance, the text may include: "There is a scene with two cats, a bookshelf and a television." The text is then converted to speech 72 so that an audio file may be generated for this description. The audio file speech may be a user-defined option to include generation of male-sounding voices, female-sounding voices, various accents (e.g. American, British, etc.) and like characteristics. This concept can be applied for a selected language or a set of different languages. Thus, the audio file of the DVS speech may be re-multiplexed into the program stream on a separate PID 74. The result is a modified program including an automatically generated DVS track. Accordingly, the inserted DVS audio file may be played and audible to a viewer during an appropriate gap in the dialog of the original program so as not to talk over the original dialogue.

Accordingly, any of the above discussed embodiments may be used on existing or older programs such that many archives of older programs may be processed in a batch mode to quickly build a library of programs with DVS tracks to help sight-impaired viewers enjoy more television, movie, and like programming. Thus, the embodiments disclose automatic generation of DVS tracks, as opposed to a costly manual process. Because of the production effort required for a DVS track, the amount of content with available DVS has been limited. The embodiments discussed above provide easier, quicker, and less expensive manners of generating DVS tracks.

A system for carrying out any of the above disclosed methods may include software or the like provided on a circuit board or within another electronic device and can include various processors, microprocessors, modules, units, components, controllers, chips, disk drives, and the like. It will be apparent to one of ordinary skill in the art that systems, modules, components, units, processors, servers, and the like may be implemented as electronic components, software, hardware or a combination of hardware and software for purposes of providing a system.

Figure 4:
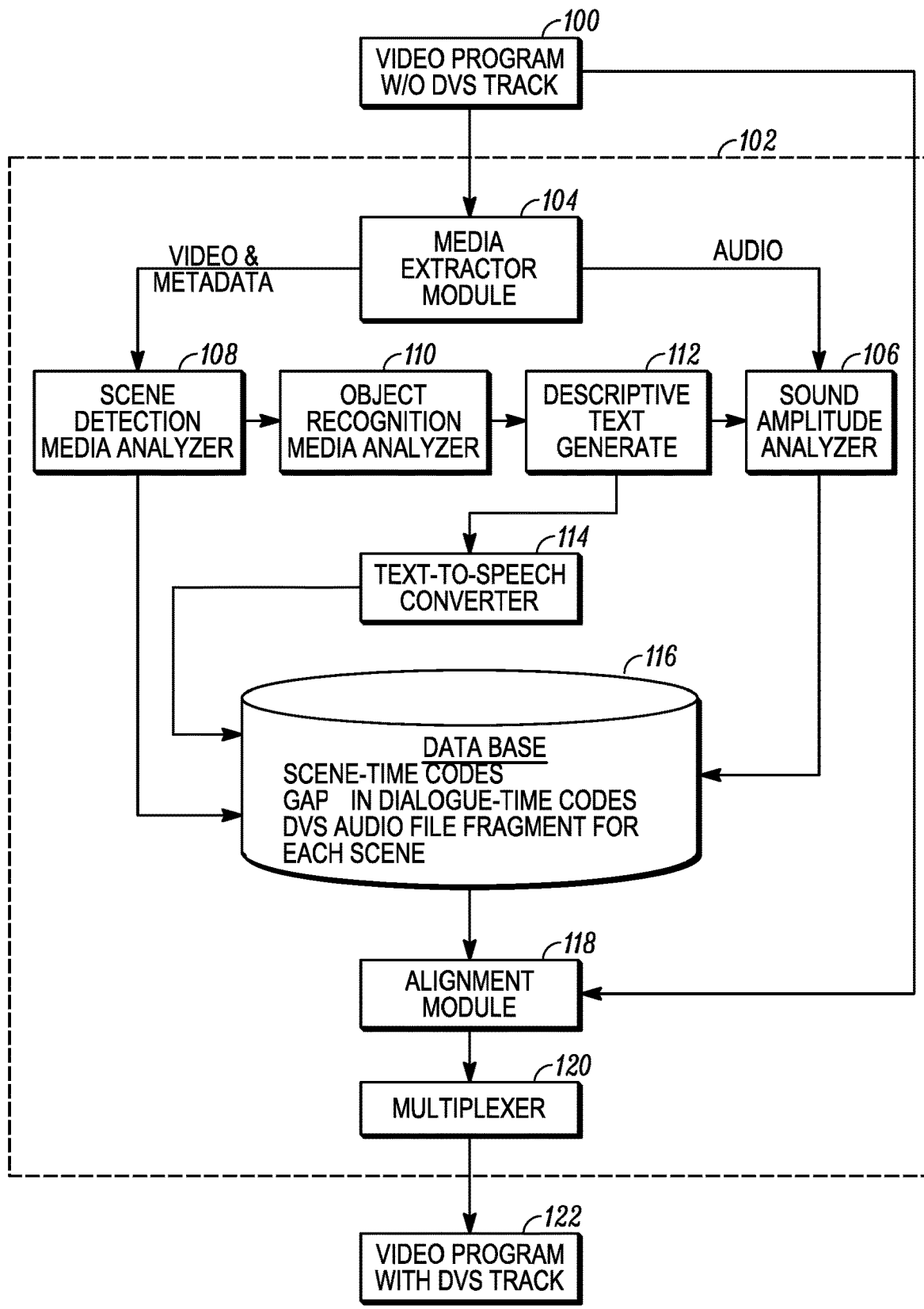
FIG. 4 is a diagram of architecture of a system for automatically generating a DVS track in accordance to an embodiment.

An example of an embodiment of a system for carrying out the above referenced process is shown in FIG. 4. A video program 100 without a DVS track is input into an electronic device 102. The video program 100 can be provided, pulled, or received from any source, such as from a source or content provider, a server, a local or remote video storage unit, a server located on the cloud, or the like. The device 102 may be provided as part of CPE at a site of a customer, may be provided by equipment located on a network of a content provider or like entity, or may be provided on a local or remote server or a server in the cloud or at any other location under the control of any entity (i.e., viewer, content provider, etc.).

The device 102 is configured to receive any given program, such as program 100, and to process the program to produce DVS tracks for the program. For example, the device 102 may include a media extractor module 104 that provides the audio of the program to a sound amplitude analyzer 106 and video and/or metadata or the like to a scene detection media analyzer 108.

An example of a component, such as component 106, for detecting gaps in audio may be provided via a sound amplitude scheme which is configured to detect periods of silence within a movie/video asset. In embodiments, a normalized scale may be used, with a level of zero being complete silence, and a level of 100 being maximum volume. In embodiments, a predetermined threshold may be established for determining a period of silence. In embodiments, a predetermined duration may be established for detecting silence breaks that are eligible for insertion of a DVS speech fragment. For example, a volume threshold of 20 and a duration threshold of 5,000 milliseconds may indicate that, when a silence break is below a normalized amplitude of 20 for at least 5,000 ms, that it is deemed to be an eligible silence break into which DVS dialog may be inserted. In some embodiments, a video asset may be preprocessed to identify all eligible breaks. The eligible breaks may be indexed in a table containing the playback time within the asset and the duration of each eligible break. Additionally, a scene identifier (unique number corresponding to each scene in a movie/program) may also be stored in the table. Then, when the system inserts speech, it can retrieve an eligible break corresponding to a scene, and insert DVS text that will fit within the duration of the silence.

An example of a component providing scene detection, such as component 108, may be based on encoding parameters, such as frame types and/or difference between frames. In some embodiments utilizing MPEG, each I-frame may be scanned for a difference in pixel values compared to a previous I-frame. When the overall difference in pixel values exceeds a predetermined threshold, it is deemed to be a new scene.

The video and metadata may also be provided to an object recognition unit 110 that recognizes the objects in each scene. This information may then be passed onto a descriptive text generator 112. The descriptive text may then be provided to a text-to-speech convertor 114.

An example of a component for converting text-to-speech may be as follows. After items in a scene are identified by unit 110, the system may generate a string containing the text for each item in unit 112. As an example: "There is a cat and a bookcase in the room." The string of words may be tokenized into words, and each word may be divided into phonemes. The phonemes are sound samples roughly corresponding to a syllable. The phonemes may be concatenated together, along with silence breaks between each word/token of the string, and an audio file, such as a PCM (Pulse code modulated) file is generated of the DVS speech fragment. In some embodiments, a locale preference may be received to further customize the generated speech based on the locale. For example, Canadian English may pronounce some words slightly differently than American English. If a Canadian locale is selected, a different set of phonemes may be used to alter the pronunciation to be more in line with Canadian speech.

The device 102 is configured to construct a database or table 116 in which the scenes, gaps in silence in the dialogue, and DVS audio fragments are indexed and stored with timecodes or the like. This information may be accessed by an alignment module 118 which receives the original video 100, aligns the DVS speech fragments with the main dialogue of the program 100 at appropriate times of eligible silence in the main dialogue within the relevant scene. A multiplexer 120 then mixes the DVS speech fragments with the main dialogue of the program 100 to produce a DVS track and thereby provides a modified video program 122 having a DVS track. Alternatively, the DVS track may be stored apart from the video program 100 and only accessed at a time, when desired.

The device 102 may be provided as a single unit or may be provided by several different units. For instance, the database 116 may be produced and stored for access at a later time.

Embodiments may include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method of generating a descriptive video service track for a video asset, comprising the steps of:
   detecting different scenes or scene transitions, via automated media analysis, of a version of the video asset;
   detecting gaps in dialogue, via automated media analysis, in at least one scene detected in the version of the video asset;
   recognizing, via automated media analysis, at least one non-textual onscreen visual element appearing in the at least one scene;
   automatically generating text descriptive of the at least one non-textual onscreen visual element appearing in the at least one scene; and
   automatically generating an audio file of the text descriptive of the at least one non-textual onscreen visual element appearing in the at least one scene of the version of the video asset.

2. The method according to claim 1, further comprising the step of using the audio file to automatically generate a descriptive video service track for the at least one scene of the version of the video asset.

3. The method according to claim 2, further comprising the step of multiplexing the descriptive video service track with a program stream of the version of the video asset to generate a modified version of the video asset including the descriptive video service track.

4. The method according to claim 1, further comprising the step of determining a level of relevance of the at least one non-textual onscreen visual element relative to another one or more non-textual onscreen visual element appearing in the at least one scene.

5. The method according to claim 4, wherein said determining step includes at least one of determining an amount of time the at least one non-textual onscreen visual element remains visible in a scene, determining how large the at least one non-textual onscreen visual element appears in a video frame of a scene, determining if the at least one non-textual onscreen visual element is centered within the video frame or appears only in a margin of the video frame, determining whether or not the at least one non-textual onscreen visual element remains still within the video, determining a degree of motion of the at least one non-textual onscreen visual element within the video, and determining a brightness or color characteristic of the at least one non-textual onscreen visual element.

6. The method according to claim 1, wherein said detecting gaps step, recognizing step, and generating descriptive text step are performed for each scene of the video asset.

7. The method according to claim 1, wherein said step of generating an audio file includes use of text-to-speech software.

8. The method according to claim 1, wherein audio corresponding to the generated descriptive text for a scene is inserted in a program stream of the version of the video asset at a gap where dialogue is not detected in the version of the video asset for the scene.

9. A system of generating a descriptive video service track for a video asset, said system comprising electronic apparatus having at least one processor configured to:
   detect different scenes or scene transitions, via automated media analysis, of a predetermined version of the video asset;
   detect gaps in dialogue, via automated media analysis, in at least one scene detected in the predetermined version of the video asset;
   recognize, via automated media analysis, at least one non-textual onscreen visual element appearing in the at least one scene;
   generate text descriptive of the at least one non-textual onscreen visual element appearing in the at least one scene; and
   generate an audio file of the text descriptive of the at least one non-textual onscreen visual element appearing in the at least one scene of the predetermined version of the video asset.

10. The system according to claim 9, wherein the at least one processor is configured to use the audio file to automatically generate a descriptive video service track for the at least one scene of the predetermined version of the video asset.

11. The system according to claim 10, wherein the electronic apparatus comprises a multiplexer to multiplex the descriptive video service track with a program stream of the predetermined version of the video asset to generate a modified version of the video asset which includes the descriptive video service track.

12. The system according to claim 9, wherein the at least one processor is configured to determine a level of relevance of the at least one non-textual onscreen visual element relative to another one or more non-textual onscreen visual element appearing in the at least one scene.

13. The system according to claim 12, wherein the level of relevance of the at least one non-textual onscreen visual element appearing in the at least one scene is determined by at least one of determining an amount of time that the at least one non-textual onscreen visual element remains visible in a scene, determining how large the at least one non-textual onscreen visual element appears in a video frame of a scene, determining if the at least one non-textual onscreen visual element is centered within the video frame or appears only in a margin of the video frame, determining whether or not the at least one non-textual onscreen visual element remains still within the video, determining the degree of motion of the at least one non-textual onscreen visual element within the video, and determining the brightness or color characteristics of the at least one non-textual onscreen visual element.

14. The system according to claim 9, wherein the electronic apparatus comprises a sound amplitude analyzer to detect the gaps in dialogue in audio of the main dialogue of the video asset.

15. The system according to claim 14, further comprising a media extractor module for extracting the audio of the main dialogue of the video asset from the video asset and for feeding the main dialogue to the sound amplitude analyzer.

16. The system according to claim 9, wherein the electronic apparatus comprises at least one media analyzer for scene detection and recognizing the at least one non-textual onscreen visual element in the video asset.

17. The system according to claim 9, wherein the electronic apparatus comprises a text-to-speech converter for generating descriptive video service audio fragments.

18. The system according to claim 9, wherein the at least one processor is configured to insert audio corresponding to the generated descriptive text for a scene in a program stream of the predetermined version of the video asset at a detected gap in dialogue detected in the predetermined version of the video asset for the scene.

19. The system according to claim 9, wherein the at least one processor is configured to produce a database of information that indexes scenes of the video asset, the gaps in dialogue within the video asset, and descriptive video service audio fragments for use in producing a descriptive video service audio track for the video asset.

20. A non-transitory computer-readable storage medium comprising stored instructions which, when executed by one or more computer processors, cause the one or more computer processors to perform steps of:
  detecting different scenes and scene transitions, via automated media analysis, of a predetermined version of a video asset;
  detecting gaps in dialog, via automated media analysis, in at least one scene detected in the predetermined version of the video asset;
  recognizing, via automated media analysis, at least one non-textual onscreen visual element appearing in the at least one scene;
  automatically generating text descriptive of the at least one non-textual onscreen visual element appearing in the at least one scene; and
  automatically generating an audio file of the text descriptive of the at least one non-textual onscreen visual element appearing in the at least one scene of the predetermined version of the video asset.

\* \* \* \* \*